TRIPLE STORAGE TUBE NARROW BAND TELEVISION

Filed Oct. 20, 1965 5 Sheets-Sheet 1

INVENTOR.
GEORGE J. DOUNDOULAKIS
BY
Constantine A. Michalos
ATTORNEY

TRIPLE STORAGE TUBE NARROW BAND TELEVISION

Filed Oct. 20, 1965 5 Sheets-Sheet 2

INVENTOR.
GEORGE J. DOUNDOULAKIS
BY
Constantine A. Michalos
ATTORNEY

Aug. 5, 1969 G. J. DOUNDOULAKIS 3,459,886

TRIPLE STORAGE TUBE NARROW BAND TELEVISION

Filed Oct. 20, 1965 5 Sheets-Sheet 3

INVENTOR.
GEORGE J. DOUNDOULAKIS
BY
Constantine A. Michalos
ATTORNEY

INVENTOR.
GEORGE J. DOUNDOULAKIS
BY
Constantine A. Michalos
ATTORNEY

INVENTOR.
GEORGE J. DOUNDOULAKIS
BY
Constantine A. Michalos
ATTORNEY

United States Patent Office 3,459,886
Patented Aug. 5, 1969

3,459,886
TRIPLE STORAGE TUBE NARROW BAND TELEVISION

George J. Doundoulakis, 2498 Kayron Lane, North Bellmore, N.Y. 11710

Filed Oct. 20, 1965, Ser. No. 498,465
Int. Cl. H04n 3/16, 7/00, 5/00
U.S. Cl. 178—6.8 18 Claims

ABSTRACT OF THE DISCLOSURE

A television system having a television camera for scanning an image to be reproduced including three storage tubes, a first storage tube storing the intensity of an image as it is, a second storage tube storing a retardational signal corresponding to the intensity of the image stored in the first tube, and a third storage tube storing the retardation signal corresponding to the difference in intensity between the image stored in the first storage tube and the intensity of the previous image; and a cyclic counter serving to control which lines are to be transmitted to produce the television image utilizing a reduced frequency bandwidth.

This invention relates to electronic systems for scanning, transmitting, and reproducing images and, more particularly, to electronic systems such as used in television for transmission of image information using a variable rate of scanning which is derived from the information contained in the image being scanned.

The required bandwidth in television and other scanning systems results from the rate of variation of the intensity along horizontal strips of the scanned configuration. In television systems, the faster the rate of change of the picture intensity, the greater the required bandwidth; thus the required frequency bandwidth is determined by the rate of variation of intensity, and, therefore, the rate of variation of the video signal necessary to change the intensity of the picture from extreme white to extreme b'ack, or vice-versa, within a fixed short length interval along the horizontal line of the picture.

Scanning is also employed in a multitude of other instances, as for example, in computers, in facsimile, and in stencil-cutting for mimeograph machines. For every such device a frequency bandwidth is assigned. The frequency bandwidth, in every case, may be visualized as the speed of response required of the particular device to reproduce the sharpest variations of signal intensity within the time allowed. Devices employing scanning could utilize narrower frequency bandwidths if the rate of scanning were slowed down. This, however, would result in direct deterioration of the performance of the particular system. For example, in the case of television, if the number of frames were reduced, a flicker of the picture would result which would make it uncomfortable to the viewer. Slowing down the scanning rate of a facsimile system would correspond directly to a loss of time and, therefore, would result in proportionate inefficiency of the system.

Reduction of the required bandwidths for applications, such as mentioned above, will not only improve the efficiency of presently available devices using scanning techniques, but will also enable the feasibility and generation of new devices. Such new devices cannot function today because conventional methods and systems demand frequency bandwidths which cannot presently be accommodated by such devices. For example, slow response devices such as the phonograph type and other mechanical systems, audio tape recorders, narrow frequency bandwidth transmission lines such as telephone lines, cannot process television video signals at present.

In my co-pending application Ser. No. 190,973 now U.S. Patent 3,204,026, filed Apr. 30, 1962, I have shown that a reduction in the frequency bandwidth can be realized if the rate of scanning of a visual image does not remain uniform, as is the case in the conventional television, but is continuously adjusted so that the rate of scanning is delayed during the scanning of line segments at which a variation of intensity occurs. The rate of scanning along uniform intensity line segments can then be increased to compensate for time loss in the non-uniform intensity line segments.

In addition I have shown in the co-pending application Ser. No. 190,973 now U.S. Patent 3,204,026 that reduction in the required frequency bandwidth can only be achieved if advanced information, as to an intensity variation which is to occur after a uniform intensity line segment, is supplied to the receiving equipment, sufficiently in advance to permit the receiving equipment to adjust its speed to the delayed rate of scanning required during an intensity variation. If such advanced information is not available to the receiving equipment, an increase rather than a decrease in the required bandwidth will result.

The method by which the variable scanning system was solved in my previous application Ser. No. 190,973 now U.S. Patent 3,204,026, incorporated means for delaying the signal supplying the scanning rate information. Thus, from the same signal, two signals were generated, one in real time, the other in delayed time. The signal in real time was then employed to supply the advanced information which, as explained above, is necessary. This complication was solved at the expense of circuit complexity through feedback electronic controls which supply compensations and adjustments. In addition, it was found in practice that these feedback controls had to be individually adjusted at different times for proper performance.

Another co-pending application Ser. No. 449,993 filed Apr. 22, 1965, now U.S. Patent 3,384,710, by the present inventor, provides a new approach for the supply of the advanced information. The picture is first scanned and a scanning rate information signal is derived and is stored in a storage tube driven by common deflection voltages in both the vertical and horizontal sense as the television camera. The stored scanning rate information signal pertains to the amount of slowing down in the horizontal scanning velocity from a predetermined high scanning velocity. The scanning rate signal acts to retard the velocity of scanning from a predetermined high scanning velocity, and therefore may be viewed as a retardation signal. In addition, while the retardation signal is allowed to increase quickly, its decay may be extended in time so that its frequency bandwith be restricted to within an available bandwidth. By scanning the image horizontally in both directions, left to right and right to left, the accumulated velocity retarding signal in the storage tube is stretched in both directions. Thus, regardless of the direction of horizontal scanning, advanced information is supplied to the image reproducing portion of the invention, about any intensity variation to follow.

The concept here may be compared with the placement of road signs so that the driver of an oncoming automobile be guided in slowing down, sufficiently in advance, of a sharp curve or a road depression. If the road signs were to be substituted by a continuous marking on the road the speed of a traveling automobile could be continuously controlled by such marking. However, such marking would have to be inscribed on the road by a vehicle traveling in the opposite direction than the lane traffic; the marking then at any instant will correspond to the road already traveled and inspected by the marking vehicle and to the road lying ahead of the traveling traffic vehicle. Suppose for example that the marking on the road consisted of a continuous line whose width was to represent the degree at which the break of the oncoming automobiles must be depressed and that the wider the line the greater the depression that should be applied on the brake. The width of the line then would constitute a slowing down signal, corresponding to the retardation signal provided by the invention. Frequency bandwidth is saved if the scanning system scans at high speed over segments of the image where the intensity is uniform because no signal variation need be transmitted. The invention then covered by the application 449,993 provides for slowing down only over segments of the image where variation of the intensity does occur.

The present invention utilizes a bi-directional scanning, comprising means for generating signals at reduced frequency bandwidth, means of transmitting these signals, means of receiving the signals and means of reproducing images from the received signals.

In the portion of signal generating means in the invention, of the co-pending application Ser. No. 449,993, now U.S. Patent 3,384,710, a television camera and a storage tube are scanned by horizontal and vertical sweep voltages. The direction of horizontal scanning is reversed at the end of each image field. The horizontal sweep signal is derived from scanning rate generating means comprising a voltage sweep generator. The flow of charge into a condenser in the sweep generator is restricted in accordance to the rate of change of the image intensity scanned by the television camera. In addition, the restriction on the flow of charge is extended in time by an amount depending on the frequency bandwidth of the transmission system. The amount of restriction of the electron flow into the above condenser is recorded and read from the storage tube. Since the image is scanned in both directions, the storage tube has stored therein an image of the amount of velocity retardation extended in both directions. During each scan, means are provided for the storage tube to read and adjust its signal to new information.

The transmission system covered in the application 449,993 transmits several discreet signals, the image intensity signal, the horizontal sweep signal and vertical sweep signal.

Transmission of these signals may be accomplished by three separate conductors or each signal may be multiplexed and modulated on the same or separate frequency carriers, FM, AM or in any other type of modulation.

After receiving the signals, the image reproducing portion of the invention supplies fixed voltages to which the received signals are compared and adjusted. They may then be fed directly to the television system or monitored for reproduction of the image. The image reproducing portion of the invention becomes, therefore, greatly simplified, compared to conventional television sets. It should be noted though that a separate channel will have to be provided for the transmission of sound associated with each image.

In order for the invention to be better understood as its description progresses, a general description of the mode of operation of the system and how it accomplishes frequency bandwith reduction now follows.

The present improvement generally operates to provide further frequency bandwidth reduction by transmission of the difference of intensity between two consecutive TV images. It has long been recognized that on the average only a portion of the image changes from one TV field to the next. Therefore, if the change of information from one image to the next is utilized in scanning a further greater reduction in the required frequency bandwidth may be gained. A conventional uniformly scanning system could not take advantage of such reduction of information. Even if only one intensity variation were to be transmitted per second, the conventional system can allow only a short time interval during the intensity change and, therefore, it must utilize the same bandwidth as in the case where an intensity variation would have occurred during every image cell. Once a variable speed scanning becomes feasible, in accordance with the present invention, the reduction ratio in bandwidth is closely associated with the ratio of the number of intensity changes per second to the number of cells distinguished in a full image field. The lower the number of intensity changes that must be transmitted per second, the greater the frequency bandwidth reduction ratio.

Three signals are stored in conjunction with the image intensity signal. One storage tube is used to store the intensity of an image as it is. A second storage tube is used to store the stretched unipolar derivative of the image intensity signal and a third storage tube is used to store the stretched unipolar derivative of the difference in intensity between every two consecutive images. A number of lines then are scanned at a rate conformant to the difference of intensity between images while the third storage tube supplies the scanning rate information. After a predetermined number of horizontal lines, however, the invention provides for dual scanning on one horizontal line at a scanning speed supplied by the second storage tube. During the first scan, the image reproducing portion erases the previous information and during the second scan, full information of the particular horizontal line is restored. The television camera performs this dual scan, first in one direction and then in the reverse direction so that the second storage tube also adjusts its storage to freshly gained information.

It should be noted that the number of lines per image field is adjusted to be one less than a whole multiple of the number of lines scanned before dual scanning occurs so that consecutively every line is adjusted to exact intensity after a certain number of full fields. This is important because the reproducing set must be able to build up a reference image regardless of the time it is turned on. This is important since small intensity errors will tend to accumulate and eventually wipe out the entire image.

As to the image reproducing portion of the invention, a simple storage tube supplies means for storing the previous image. No storing of the scanning rate is necessary because such information arrives from the image generating portion. Further, a second embodiment of this invention combines a monitor tube and a storage tube into a direct view storage tube for both space and cost reduction.

It has been explained, in terms of the disclosures in previous applications, Ser. No. 190,973, now U.S. Patent 3,204,026, and Ser. No. 449,993, now U.S. Patent 3,384,710, that savings in the frequency bandwidth during transmission of TV images can be gained by a variable velocity scanning, capable of providing advanced information to the system, as to the variation of intensity to come. Such a system scans fast over segments of the image having uniform intensity and slows down in advance over segments where the image intensity varies. The time it takes for scanning an image then depends on the number of intensity variations in the image and on the frequency bandwidth available for transmission. Since the frequency bandwidth allocated to the conventional, uniformly scanning TV, can process an intensity variation in every cell and the average TV image presents a considerable portion of uniform intensity, saving in bandwidth is gained because for the same time per frame the variable velocity system can scan slower over variable intensity segments than the uniformly scanning TV while gaining the time lost while scanning uniform intensity segments, of the image at much higher speeds than the conventional system.

The reduction of bandwidth thus becomes a direct function of the ratio of the number of intensity variations in the average image to be transmitted divided by the number of cells in each image. The present invention provides further reduction in the required bandwidth by eliminating the need for transmission of redundant information which is repeated over several consecutive frames. Such reduction in the number of intensity changes is accomplished by the transmission of only the difference between consecutive frames. The invention also provides that after the difference in intensity of a predetermined number of lines is transmitted, the full intensity of one line is transmitted so that after a predetermined number of frames the reference image is completely renewed. For the operation of such a system, three types of signals are stored in storage tubes in the transmitting site. One storage tube stores the intensity of an image as it is, so that it may be compared with the intensity of the next image. A second storage tube stores the retardation signal corresponding to the intensity of the image stored in the first storage tube. A third storage tube is used to store the retardation signal corresponding to the difference in intensity between the image stored in the first storage tube and the intensity of the previous image.

A cyclic counter serves to control which lines are to be transmitted as a difference of intensity and which lines as full intensity while the scan rate is switched from the second storage tube to the third storage tube, respectively. In the receiving site only a single storage tube is provided for the storage of the intensity of the last image. The signal supplied to the monitor during the transmission of the intensity difference is then provided as the sum of the signals read from the single storage tube in the receiving site and the arriving intensity signal. The scanning rate signals used in the receiving site are directly transmitted from the transmission site. A detailed description of the electronic components comprising the system of this preferred embodiment will be described hereinafter.

It is therefore among the objects of the present invention to provide means for accomplishing continuous writing, erasing, and reading an image by utilizing three separate storage tubes cycled through erasing, writing, and reading operations.

Another object of this invention is to provide an improved electronic system for variable scanning of visual images, capable of deriving the advanced information needed to regulate the rate of scanning of an image for the purpose of obtaining output signals which can be transmitted to a receiving station by a narrower frequency bandwidth transmission line than would otherwise be required for accurate reproduction of the image.

A further object of the present invention is to provide means for reducing the redundancy in the transmission of information common to two or more consecutive images to thereby reduce the amount of transmitted information and therefore reduce the required frequency bandwidth of the transmission systems.

Another object of the present invention is to provide for a stable variable scanning, narrow frequency bandwidth picture transmission and reproduction system capable of reproducing accurate images without need of numerous adjustments.

A further object of the present invention is to provide means for reducing the redundancy in the transmission of information common to two or more consecutive images to thereby reduce the amount of transmission systems.

Another object of this invention is to provide a variable speed scanning system capable of processing information pertaining to visual images at a high rate of information per unit of utilized frequency bandwidth.

Still another object of the invention is to provide a simplified and efficient method and means for reading, processing, transmitting, recording, receiving and reproducing image information of other type information which is first transformed into an image.

An additional object of the present invention is to provide coded visual information contained on a visual display in a narrow bandwidth signal, so that this signal may be recorded on low frequency tape, and on long-playing records now employing stereophonic sound, and, in addition, it may be utilized in television-telephones requiring only a limited number of lines to be transmitted by telephone circuits and narrow bandwidth wireless channels.

It is a further object of this invention to provide a method of increasing efficiency by reducing the bandwidth now required by conventional devices employed in scanning, transmitting, recording and reproducing visual information or any other data which may be presented in two dimensional matrix form, so that better performance is achieved with the presently employed bandwidth.

It is also an object of the invention to code television programs and other visual information in such a manner that conventional receiving devices are unable to translate and process the information, but receiving and processing apparatus in accordance with the invention will be able to reproduce the visual information for "Pay Television" applications, educational or military purposes, and other programs and transmissions intended for retricted groups of individuals.

Objects and advantages other than those above set forth will be apparent to those skilled in the art from the following description in terms of the embodiments thereof when read in connection with the accompanying drawings in which.

Figure 1:
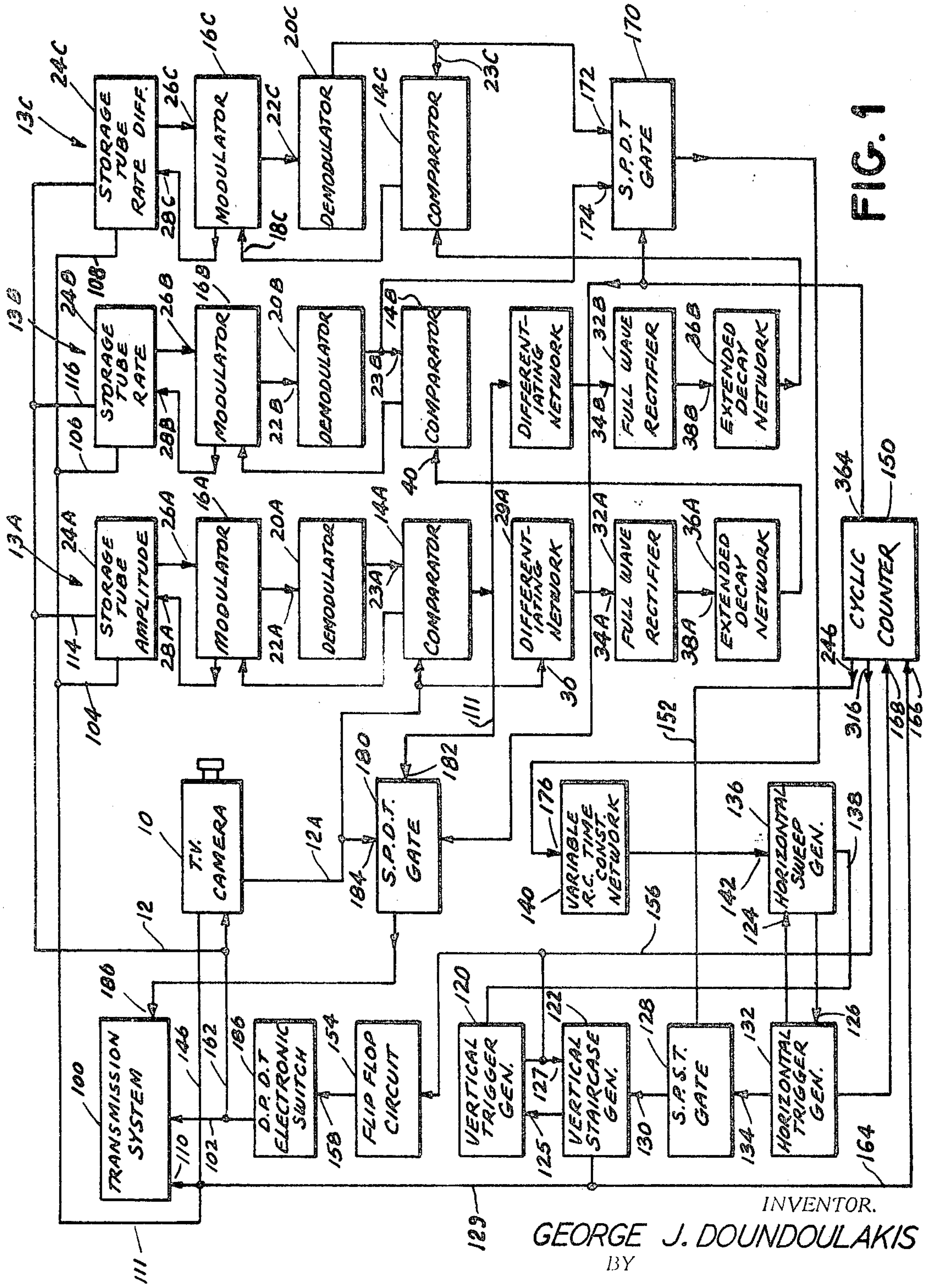
FIGURE 1 shows a functional block diagram of an image signal generating portion in accordance with a preferred embodiment of the invention.

A detailed description of the electronic components comprising a preferred embodiment of the invention is demonstrated by referring now to the functional block diagram of FIGURE 1 wherein an intensity signal generating means comprising, a television camera 10 is shown connected by a line 12, to means of storing the first intensity signal, a first storage chain 13A. In reference to the drawing of FIGURE 1, there is indicated a triplicated storage chain circuit in which the corresponding elements and interconnections of each circuit have been indicated by like numerals to which there have been applied the suffix A, B and C to distinguish between the respective elements of the first, second and third circuits which are indicated as 13A, 13B and 13C respectively. The first storage chain 13A is comprised of a comparator 14A, a demodulator 20A connected to the modulator 16A, as shown by arrow 22A and to the comparator 14A as shown by arrow 23A. A storage tube 24A is connected for supplying a signal to the modulator 16A as shown by an arrow 26A and for receiving signals for storage from the modulator 16A as shown by arrow 28A. This circuitry as just described is comparable to the circuitry of my co-pending U.S. application Ser. No. 449,993 filed Apr. 22, 1965 now U.S. Patent 3,384,710 comprised of a single storage tube, modulator, demodulator and comparator in substantially the same layout.

The television camera 10 provides image intensity signals to the electronic circuitry of the storage chain 13A just described. As shown, the television camera 10 is also connected to the differentiating network 29A as shown by an arrow 30 which directs a signal fed from the camera 10 to a full wave rectifier 32A, as shown by an arrow 34A, and to an extended decaying network 36A, as shown by arrow 38A. This circuit just described provides for a stretched unipolar derivative of the image intensity signal which is supplied to a second comparator 14B of the second storage chain 13B as shown by an arrow 40.

The comparator 14B is included in a second storage chain 13B which also includes a demodulator 20B, a modulator 16B connected to the demodulator 20B, as shown by arrow 22B and a second storage tube 24B directing signals to the modulator 16B as shown by arrow 26B and receiving signals as shown by arrow 28B. The second storage chain 13B is interconnected by the same line circuitry as shown for the first storage chain 13A. This circuitry just described is compared in mode and operation with the first storage chain 13A. It operates to store the uni-polar derivative of the intensity signal supplied by camera 10. The same storage utilized in the copending application Ser. No. 449,993, now U.S. Patent 3,384,710. It should be noted that the function of the first storage chain 13A is to store the intensity signal from camera 10 as it is while the second storage chain 13B stores the uni-polar derivative of this signal.

As provided in this invention, a third storage chain 13C is comprised of a third storage tube 24C connected to a modulator 16C for receiving signals from the storage tube as shown by arrow 26C. The modulator 16C directing signals back to the storage tube 24C as shown by arrow 28C. Connecting the modulator 16C by an arrow 22C is a demodulator 20C and connecting the demodulator 20C by an arrow 23C is a comparator 14C. The comparator 14C is in turn connected to the modulator 16C as shown by arrow 18C. Therefore, a signal directed to the comparator 14C is compared in a manner hereinafter more fully described.

In addition to the three storage chains 13A, 13B and 13C, there is provided a transmission system 100 receiving signals as shown by line 102 from a double pole double throw electronic switch 186. In addition, each of the storage tubes 24A, 24B and 24C also receive the same signal corresponding to the horizontal sweep voltage. In addition, the transmission system 100 receives signals from the vertical staircase generator 122 as shown by arrow 110, which is the same signal also supplied to each of the storage tubes 24A, 24B and 24C by line conductors 104, 106 and 108 respectively, through line conductor 111. The signal directed through line conductor 111 corresponds to the vertical sweep signal. The same signal is also directed to the camera 10 through conductor 146.

As provided, the generation of the horizontal and vertical beam deflection signals is triggered by a circuitry comprised of a horizontal trigger generator 132 interconnected with a horizontal sweep generator 136 as shown by arrows 124 and 126. The trigger generator 132 is also connected to a single pole single throw gate 128 as shown by arrow 134 which in turn is connected to a vertical staircase generator 122 as shown by arrow 130. A vertical trigger generator 120 is interconnected to the vertical staircase generator 122 as shown by arrows 125 and 127 which in turn is connected to the transmission system 100 by line 129. The vertical trigger generator 120 is also connected to the horizontal sweep generator 136 as shown by line 138.

The trigger generator 132 supplies trigger from a signal received from the horizontal sweep generator 136 which in turn is driven by a signal received from a variable R.C. time network 140 as shown by arrow 142.

As shown in FIGURE 1, the system also provides a cyclic counter 150 which produces switching signals for reasons hereinafter more fully described. The cyclic counter 150 is connected to the single throw gate 128 by a line 152 and to a flip-flop circuit 154 as shown by line 156. Further, the flip-flop circuit 154 is connected to a double pole, double-throw electronic switch 186 as shown by arrow 158 which in turn is connected to the transmission system 100 by line 102 and to the television camera 10 by line 162. The cyclic counter 150 is connected to the flip-flop circuit 154 through the line 156 and is also connected to the vertical staircase generator 122 by a line 164. Furthermore, the cyclic counter 150 receives signals from the vertical staircase generator 122 and the horizontal trigger generator 132 as shown by arrows 166 and 168 respectively. In addition, the cyclic counter 150 directs a signal to the single pole double throw gate 170 and to a single pole double throw gate 180. The gate 170 also receives signals from the demodulator 20C as shown by arrow 172 and from the demodulator 20B as shown by arrow 174. In addition, the gate 170 directs signal to the variable R.C. time constant network 140 as shown by arrow 176.

The cyclic counter 150 provides switching signals for preventing a pulse from the horizontal trigger generator 132 in reaching the vertical staircase generator 122 by causing the gate 128 to disrupt conduction of such a pulse.

In addition, the cyclic counter 150 provides for switching the gate 180 from connecting an image intensity signal to the transmission system 100 and thereby directs it to the mode of connecting the difference of the image intensity signal between two consecutive image fields of the transmission system 100. As shown, the single pole double throw gate 180 receives signals from the comparator 14A and the television camera 10 as shown by arrows 182 and 184 respectively. The single pole double throw gate 180 is connected also to the transmission system 100 as shown by arrow 186.

In addition, the cyclic counter 150 provides for a first voltage pulse to flip the flip-flop circuit 154 which determines the direction of the horizontal scan and a second voltage pulse to flop the flip-flop circuit 154 to its original state through the line 156.

In addition, the cyclic counter 150 operates to switch the single pole double throw gate 170 from its regular mode of operation, in connecting the stretch bi-polar derivative signal of the image intensity difference between two consecutive image fields from the demodulator 20C to the variable R.C. time constant network 140, to a temporary mode of operation providing connection of the stretch bi-polar derivative of the image intensity from the demodulator 20B to the variable R.C. constant network 140.

Figure 2:
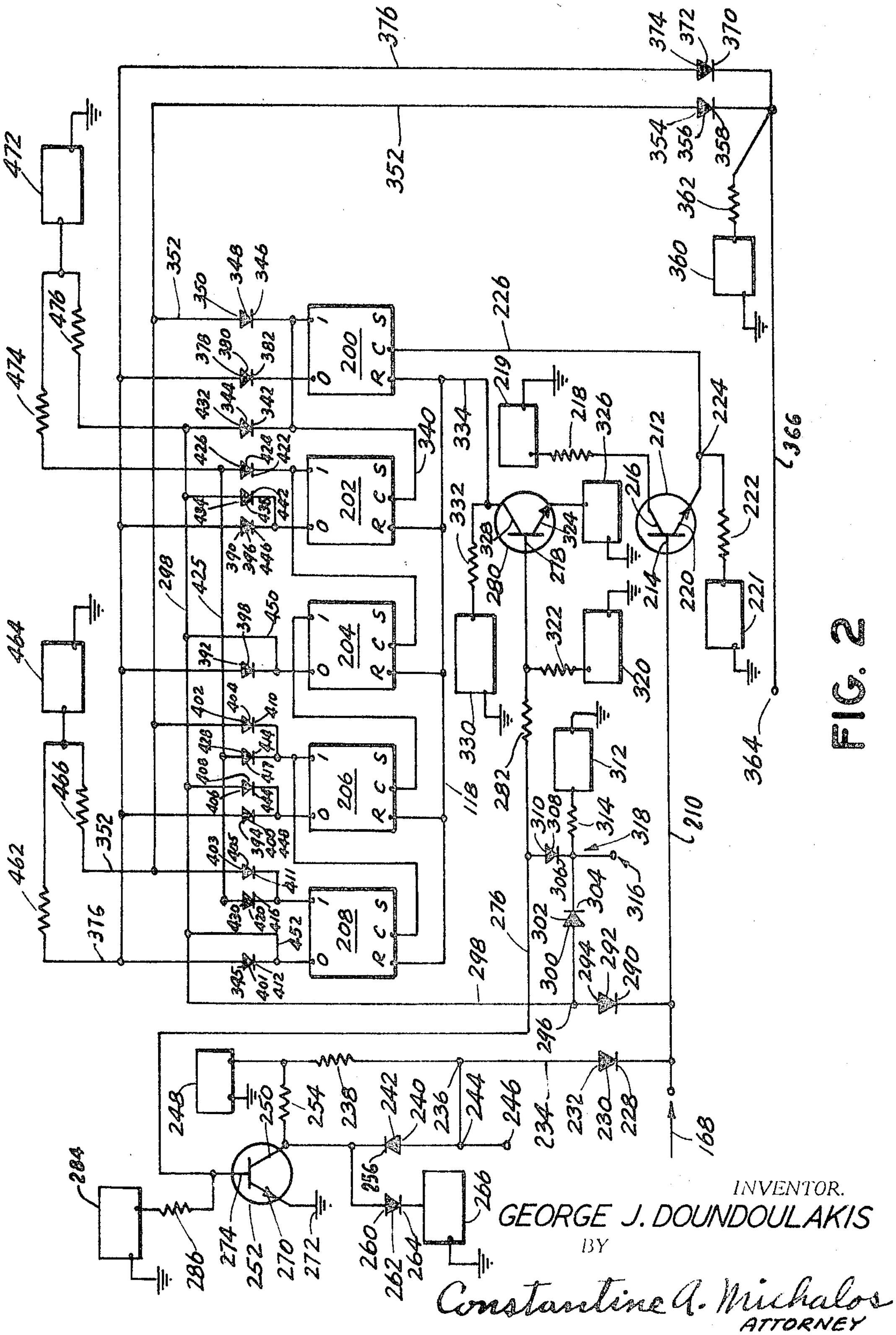
FIGURE 2 is a semi-detailed electronic diagram of a cyclic counter shown in FIGURE 1.

Referring now to FIGURE 2 of the drawing, there is shown five flip-flop circuits 200, 202, 204, 206 and 208, connected as binary counter units. It should be noted that (0) and (1) outputs correspond to the (on) state of each binary counter unit and that the notations R, C, and S, correspond to the inputs, to the binary counter unit such as "reset," "complement" and "set" respectively. The flip-flop circuits are interconnected to form a binary counter of five digits so that it can count from zero to 31. In this example it need only count to number 26.

Pulses from the horizontal trigger generator 132 shown in FIGURE 1 are fed as shown by the arrow 168 of FIGURES 1 and 2 through a line conductor 210 to the complement input C of the counter unit 200 by line conductor 226 through a transistor 212. The line conductor 210 is connected to a base terminal 214 of the transistor 212. A collector 216 of the transistor 212 is connected to a 15-volt potential 219 through a resistor 218. An emitter 220 of the transistor 212 is connected to a negative 10-volt potential 221 through a resistor 222 and to the complement input C at a junction 224 by the line conductor 226.

In addition, the line conductor 210 is connected to a cathode 228 of a diode 230 having an anode 232 connected by a line conductor 234 at a junction 236 to a resistor 238 and to an anode 240 of a second diode 242. Connecting the diode 242 with the resistor 238 and the first diode 230 at a junction 244 is an output 246 which provides voltage during a counting of 1 to 25 but not during the 26th count, hereinafter more fully described. The resistor 238 is connected to a 15-volt potential 248 and to a collector terminal 250 of a transistor 252 through a resistor 254. In addition, a cathode 256 of the diode 242 interconnects the resistor 254, the collector terminal 250 of the transistor 252 and an anode 260 of a diode 262 having a cathode 264 connected to a five-volt positive potential 266.

Further, as shown, an emitter 270 of the transistor 252 is connected to ground 272 and a base terminal 274 of the transistor 252 is connected through a line conductor 276 to a base terminal 278 of a transistor 280 through a resistor 282. Further, the base terminal 274 of the transistor 252 is connected to a 2-volt negative potential 284 through a resistor 286.

In addition, the line conductor 210 which receives the pulses from the horizontal trigger generator 132 of FIGURE 1 is also connected to a cathode 290 of a diode 292 having an anode 294 connected at a junction 296 to a line conductor 298 which in turn is connected to the counters 200 to 208 as hereinafter more fully described and to an anode 300 of a diode 302 having a cathode 304 connected to a cathode 306 of a diode 308 having an anode 310 connected to the line conductor 276. Further, as shown, the cathode 304 of the diode 302 and the cathode 306 of the diode 308 is connected to a 2-volt negative potential 312 through a resistor 314. In addition, the cathodes 304 and 306 are connected to an output 316 which provides voltage pulses during the count 26 and during the count 1 through the "OR" gate 318 comprised of the two diodes 302 and 308 connected as shown.

The resistor 282 is connected with the base terminal 278 of the transistor 280 to a 10-volt negative potential 320 through a resistor 322. Further, as shown, an emitter 324 of the transistor 280 is connected to a 2-volt negative potential 326. A collector terminal 328 of the transistor 280 is connected to a 15-volt potential 330 through a resistor 332 and to the "reset" terminal R of the counters 200 through 208 by a line conductor 334.

As shown, the counters are interconnected by a plurality of diodes. The counter 200 comprises 0 and 1 outputs with the output 1 connected to the complement C of the counter 202 through a line conductor 340 which line conductor connects a cathode 342 of a diode 344 and a cathode 346 of a diode 348. An anode 350 of the diode 348 is connected through a line conductor 352 to an anode 354 of a diode 356 having a cathode 358 connected to a 2-volt negative potential 360 through a resistor 362 and through an output 364 through a line conductor 366. The output 364 provides a voltage during the count 25 through an "OR" gate comprised of the diode 356 and a diode 372. Further, as shown, the cathode 358 of a diode 356 and the resistor 362 are connected to a cathode 370 of the diode 372 having an anode 374 connected through a line conductor 376 to an anode 378 of a diode 380 having a cathode 382 connected to the 0 output of the counter 200. In addition, the line conductor 376 is connected to the anodes 390, 394, 392 and 395 of the diodes 396, 398, 400 and 401 respectively.

The line conductor 352, in addition to it being connected to the anode 350 of the diode 348, is also connected to the anodes 402 and 403 of diodes 404 and 405 respectively. Cathodes 410 and 411 of the diodes 404 and 405 are connected to the 1 output of the counters 206 and 208, respectively. In addition, connecting the output 1 of the counters 206 and 208 are cathodes 414 and 416 of diodes 417 and 420 respectively. In addition, connecting the output 1 of the counter 202 is another cathode 422 of a diode 424 having an anode 426 connecting anode 428 of the diode 417 and anode 430 of the diode 420. As shown, the diode 344 has an anode 432 connected by the line conductor 298. The line conductor 298 also connects the 0 output of the counters 204 and 208 and anodes 434 and 406 of diodes 438 and 408 respectively which connect through their cathodes 442 and 444 to the 0 output of counters 202 and 206 respectively, and to cathodes 446 and 448 of the diodes 396 and 400 respectively. As shown, the line conductor 298 also connects a 0 output through line conductors 450 and 452 of the counters 204 and 208 respectively.

In addition, connecting the 0 output of the counter 208 is a cathode 412 of the diode 401 and the anodes 294 and 300 of the diodes 292 and 302. Conductors 352 and 376 are connected to a 15-volt potential 464 through resistors 466 and 462 respectively.

Similarly, a line conductor 425 and the line conductor 298 are connected to a 15-volt potential 472 through resistors 474 and 476 respectively.

In the operation of the circuitry of FIGURE 2 and the block diagram of FIGURE 1, the output 246 shown in FIGURE 1 connected to the single pole single throw gate 128 of FIGURE 1 allows the pulses from the horizontal trigger generator 132 to reach the vertical staircase generator 122 during a count of 1 to 25, and not during the count of 26. During the 26th count, therefore, the vertical sweep voltage does not change and the same line is scanned once more. During the next pulse fed to the cyclic counter 150 as shown by arrow 168 the binary number 11010 which corresponds to the 26th count is fed from the counter 150 through the reset inverter 280 to a line conductor 118 feeding all reset inputs of the five binary counters 202 through 209, thus resetting the counters to the binary number 00000. Therefore, the output 316 provides voltage pulses during the counts of 26 and 1 through the "OR" gate 318.

The output 316 supplies these pulses to the flip-flop circuit 154 through conductor 156 shown in FIGURE 1 to reverse the direction of the horizontal scanning during the count 26 and reset it as previously during the count 1.

Further, the output 364 shown in FIGURE 2 provides a voltage during the count 25 or 0 through the "OR" gate comprised of the diodes 356 and 372 fed by a five diode AND gate comprised of diodes 401, 400, 398, 396 and 380 and a three diode AND gate comprised of the diodes 405, 404 and 348 respectively.

The output 364 feeds the single pole double throw gate 180 of FIGURE 1 which allows the image intensity from the line conductor 12A to reach the transmission system 100.

It should be noted that in the absence of a signal from the cyclic counter 150, the single pole double throw gate 180 allows the difference of image intensity between two consecutive fields from the comparator 14A to be transmitted through the line conductor 111.

The signal from the output 364 of FIGURE 2 switches on the single pole double throw gate 170 so that a stretch uni-polar derivative corresponding to full image intensity from the demodulator 20B supplying the variable RC time constant network 140 during the count of 25 to 0 instead of the stretch uni-polar derivative corresponding to the difference of image intensity between the two consecutive fields normally feeding from the demodulator 20C.

It should be noted that the double pole double throw electronic switch 186 serves to reverse the polarity of the horizontal sweep signal every time the flip-flop circuit 154 reverses the state of scan. In addition, the storage tubes 24A, 24B and 24C, as well as the television camera 10 of FIGURE 1, are driven by the same source of horizontal and vertical sweep voltage and therefore are always kept in synchronization with each other.

Figure 3:
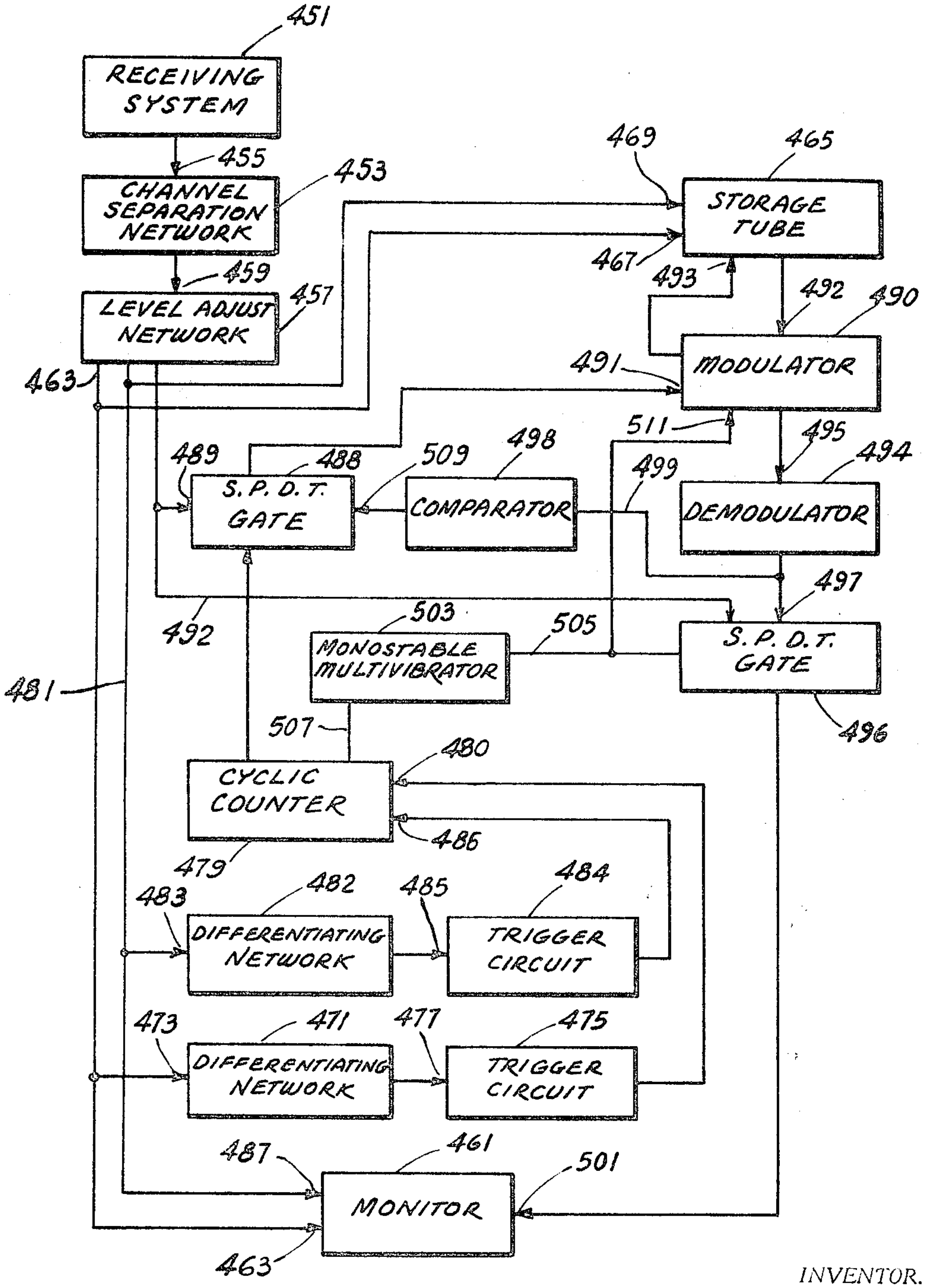
FIGURE 3 is a function block diagram of the image reproducing portion in accordance with the embodiment shown in FIGURE 1.
Figure 4:
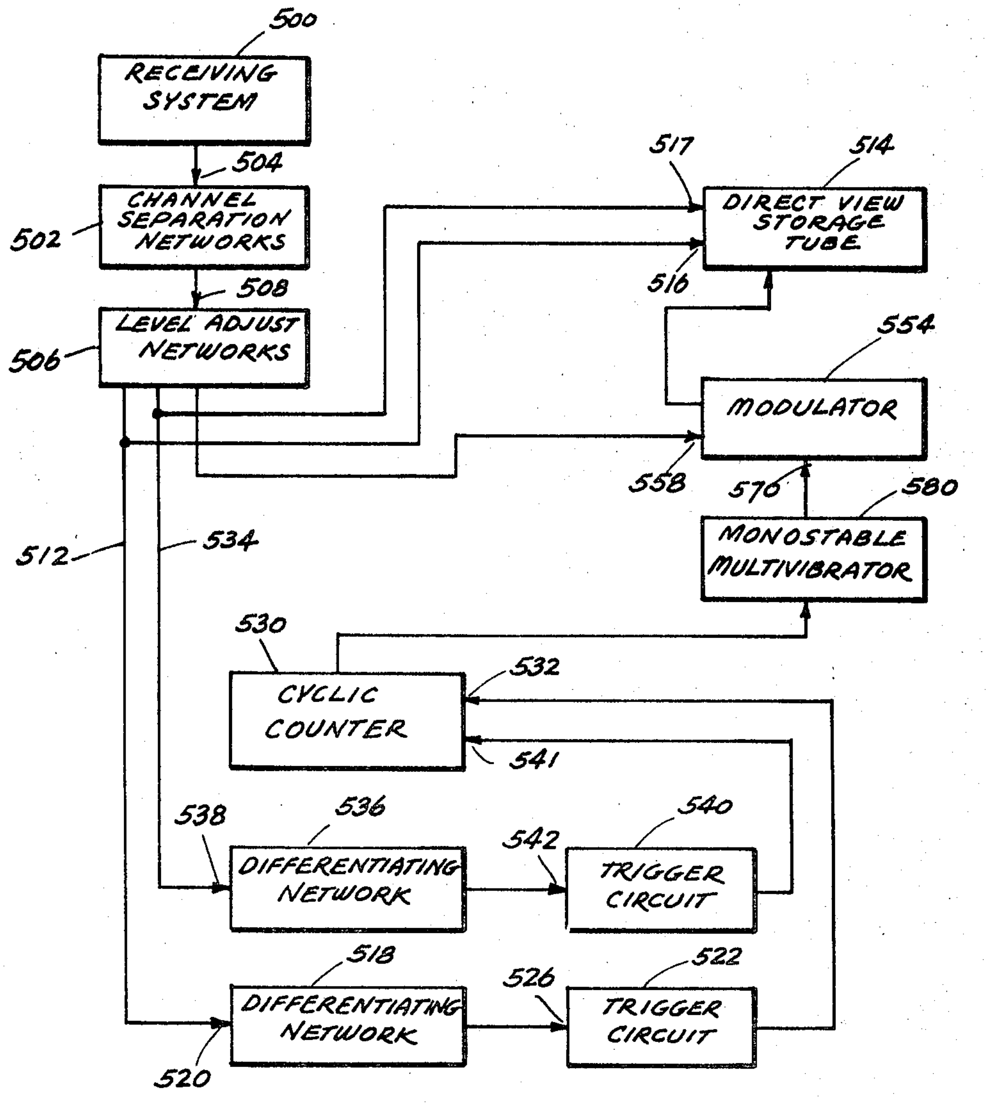
FIGURE 4 is a functional block diagram of the image reproducing portion of a second embodiment of the invention.

It should be noted that two embodiments are presented within this invention for receiving an image reproducing signal as shown in the functional block diagrams of FIGURES 3 and 4 hereinafter more fully described; FIGURE 3 shows the first embodiment comprised of the storage section separated from the display monitor and the second embodiment shown in FIGURE 4 shows the combination of the storage tubes and the display monitor combined into a single display storage tube.

Referring now to FIGURE 3 of the drawing, a receiving system 451 is connected to a channel separating network 453 as shown by arrow 455 and the channel separating network 453 is connected to a level adjustment network 457 as shown by arrow 459. It should be noted that the circuitry just described is analogous to the receiving channel separating and level adjustment networks of my copending U.S. application Ser. No. 449,933 and also as described in FIGURE 2 of this invention. The level adjustment network 457 is connected to a monitor 461 as shown by arrow 463 and to the storage tube 465 as shown by arrows 467 and 469.

In addition, as shown, the level adjustment network 457 is connected to a differentiating network as shown by an arrow 473. The differentiating network 471 is connected to a trigger circuit 475 as shown by an arrow 477. There fore, the vertical sweep voltage feeds the storage tube 465 as shown by arrow 467. The same signal then feeds the differentiating network 471 as shown by arrow 473 which produces a pulse every time the vertical sweep voltages change. This pulse is shaped by the trigger circuit 475 before it is introduced into a cyclic counter 479 as shown by an arrow 480.

The horizontal sweep signal is fed through a line conductor 481 into a second differentiating network 482 as shown by arrow 483 and into a trigger circuit 484 as shown by arrow 485 which is similarly directed into the cyclic counter 479 as shown by arrow 486. Therefore, the horizontal sweep signal is divided into the storage tube 465 as shown by arrow 469, into the monitor 461 as shown by an arrow 487 and into the differentiating network 482 as shown by the arrow 483. The signal is then directed from the network 482 to the differentiating trigger circuit 484 which feeds a shaped pulse every time the horizontal sweep voltage changes from its peak value to zero to the cyclic counter 479. It should be noted that the cyclic counter 479 is similar to the counter 150 of FIGURE 1.

In the operation of the system during the count of 1 to 24, the video signal is directed into the single pole double throw switch 488 FIGURE 3 as shown by an arrow 489 and to a modulator 490 as shown by an arrow 491. It should be noted that the signal through line conductor 492 corresponds to the difference in image intensity between the two consecutive image fields.

As shown, the modulator 490 is connected to the storage tube 465 to receive signals, as shown by arrow 492 and to return signals to the storage tube 465 as shown by arrow 493. In addition, the modulator 490 is connected to the demodulator 494 as shown by arrow 495. Further, the demodulator 494 is connected to a single pole double throw gate 496 as shown by arrow 497 and to a comparator 498 as shown by line 499. Connected to the single pole double throw gate 496 is the monitor 461 as shown by arrow 501. In addition, the single pole double throw gate 496 is connected to a mono-stable multi-vibrator 503 as shown by line 505 which in turn is connected to the cyclic counter 479 shown by line 507. In addition, as shown, the comparator 498 is connected to the single pole double throw gate 488 as shown by an arrow 509.

It should be noted that the modulator 490 permits both writing of the difference signal on the storage tube 465 and reading of the resulting sum signal of the differences and the signal storage on the storage tube 465 from the previous field. Therefore, during the count 25 and 26 or 0, full image intensity signal is transmitted through conductor 492. Therefore, on count 25 the mono-stable multi-vibrator 503 receives a pulse from the cyclic counter 479 and changes its state to a mono-stable state. The latter state then feeds a negative pulse to the modulator 490 as shown by the arrow 511 which causes the storage tube 465 to erase the 25th line.

A second embodiment of this invention is demonstrated by referring to FIGURE 4 of the drawing, whereon is shown a simpler method of receiving and reproducing an image transmitted by the transmission system 100 shown in FIGURE 1. Here a direct view storage tube at the receiving site combines both functions of the single storage tube and monitor at the receiving site. In this embodiment the storage tube and display monitor are combined into a single direct view storage tube such as the Dumont-Fairchild type K2216. This tube provides one narrow beam for writing and erasing and a second wide beam for display. Electrons from the wide beam penetrate through the element of the storage surface of the tube in quantities proportional to the positive storage accumulated by the thin writing beam on the sensitive surface. The picture, because of the continuous electron transmission, is bright enough to be viewed directly without being interfered with by daylight or to be projected by a larger area screen.

Referring again to FIGURE 4, there are shown blocks 500, 502, 506, 518, 522, 536, 540 and 530, analogous and of same design as the blocks 451, 453, 457, 471, 475, 482, 484 and 479 of FIGURE 3 respectively. Since the signal is not read in the direct view storage tube by a scanning beam the comparator 498 and the demodulator 494 of FIGURE 3 are here eliminated. The difference of the image intensity signal between the successive fields is directly fed from the level adjustment network 506 to the modulator 554. During the 25th count the cyclic counter 530 switches the mono-stable multi-vibrator 580 into its mono-stable position which supplies a negative to the modulator 554. This pulse is sufficiently negative to cause the electron beam to erase any previous information. No other signals are required from the cyclic counter 530 in this case. The cyclic counter 530, however, is similar to the cyclic counter 479 of FIGURE 3 in that it also counts from zero to 26 and that it is reset to zero either at the 26th count or the input of a pulse from the trigger circuit 540 and the absence of such a pulse from the trigger circuit 522. This occurs when the image reproducing portion is first turned on, whereby the cyclic counter 530 is synchronized with the cyclic counter 150 of FIGURE 1.

The receiving system 500 is connected to the channel separation networks 502 as shown by arrow 504 which in turn is connected to a level adjustment networks 506 as shown by arrow 508. The lead adjustment networks 506 is connected to a direct view storage tube 514 as shown by arrows 516 and 517. In addition, as shown, the level adjustment network 506 is connected to a dfferentiating network 518 by line conductor 512 as shown by an arrow 520. The differentiating network 518 is in turn connected to a trigger circuit 522 as shown by an arrow 526. Therefore, a line conductor 512 which carries the vertical sweep voltage feeds the direct view storage tube 514 as shown by arrow 516. The same signal then feeds the differentiating network 518 which produces a pulse every time the vertical sweep voltages change. This pulse is shaped by the trigger circuit 522 before it is introduced to a cyclic counter 530 as shown by an arrow 532.

The horizontal sweep signal is fed through a line conductor 534 into a second differentiating network 536 as shown by arrow 538 and into a trigger circuit 540 as shown by arrow 542 which is similarly directed into the cyclic counter 530 as shown by arrow 541. Therefore, the horizontal sweep signal is divided into the storage tube 514 as shown by arrow 517 and into the differentiating network 536 as shown by the arrow 538. The signal is then directed from the differentiating network 536 to the trigger circuit 540 which feeds a shaped pulse every time the horizontal sweep voltage changes from its peak value to zero to the cyclic counter 530.

It should be noted that the cyclic counter 530 is similar to the counter 150 of FIGURE 1 except for variations as hereinafter more fully described.

In this embodiment the difference of the image intensity signal between two successive fields is directly fed from the level adjustment network 506 to a modulator 554 as shown by arrow 558.

The modulator 554 receives signals from the cyclic counter 530 through a mono-stable multi-vibrator 580 as shown by arrow 570.

The cyclic counter 479 of FIGURE 3 and the cyclic counter 530 of FIGURE 4 are also of a similar type. A more detailed cyclic counter is shown in FIGURE 5.

Figure 5:
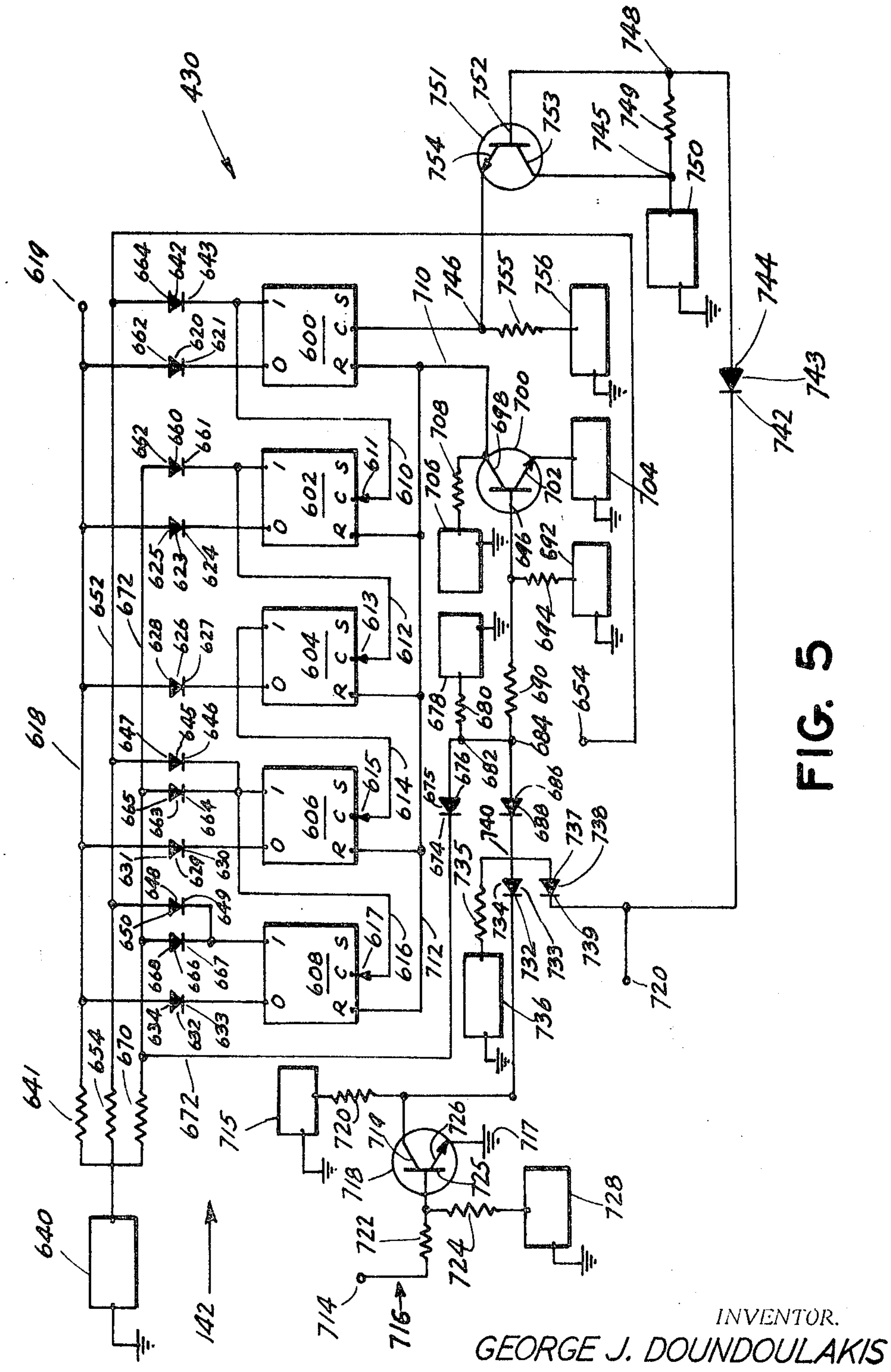
FIGURE 5 is a semi-detailed electronic diagram of a cyclic counter shown in FIGURES 3 and 4.

Referring now to FIGURE 5, the cyclic counter counter 530 comprises five binary counter units 600, 602, 604, 606 and 608. The notation 0 and 1 for the outputs corresponds to the on state of each binary counter. The notation R, C and S corresponds to the inputs Reset, Complement and Set of each binary counter unit, respectively. The binary counter 600 through 608 are comprised of conventional flip-flop circuits interconnected to form a binary counter of five digits. Such a counter can count from zero to 31 but as used in this example, it provides counting only up to number 26. The outputs 1 of binary counter 600, through 606 are connected to the inputs C or the next digit by line conductor 610, 612, 614 and 616 as shown by arrows 611, 613, 615 and 617, respectively. Thus, every time a binary counter receives a pulse while in the on state, it is switched to the off state while directing a pulse to the next digit binary counter.

FIGURE 5 shows diodes 620, 623, 626, 629 and 632 having anodes 622, 625, 628, 631 and 634, respectively, connected into a common line conductor 618. The cathodes 621, 624, 627, 630 and 633 of the diodes 620, 623, 626, 629 and 632, respectively are shown connected to the zero outputs of the binary counter units 600, 602, 604, 606 and 608, respectively. This type of connection constitutes an AND gate so that a signal appears on conductor 618 when all binary units are in the off state. The line conductor 618 is shown connected to an output 619 which receives a pulse at the zero count. The conductor 618 is also shown connected to a 15 volt positive potential 640 through a resistor 641 from where the pulse of the above AND gate is derived.

The outputs 1 of the binary counter units 600, 606 and 608 are connected into a second AND gate formed by diodes 642, 645 and 648 having cathodes 643, 646 and 649 respectively, connected to the outputs 1 of the binary counter units 600, 606 and 608 respectively and having cathodes 644, 647, and 650, respectively, connected to a common line conductor 652. The line conductor 652 is connected to the 15 volt positive potential 640 through a resistor 654. The above second AND gate serves to supply a positive pulse to the conductor 652 at the count of 11001, which corresponds to a count 25.

The outputs 1 of the binary counter units 602, 606 and 608 are shown connected into a third AND gate comprising diodes 660, 663 and 666, respectively, having cathodes 661, 664 and 667 respectively, connected to the outputs 1 of the counter units 602, 606, and 608 respectively, connected into a common line conductor 672 which in turn is connected to the 15 volt positive potential 640 through a resistor 670. The third AND gate serves to supply a positive pulse during the count 11010 which corresponds to a count 26. The line conductor 672 is shown connected to a cathode 674 of a diode 675 having its anode 676 connected to a 2 volt negative potential 678 through a resistor 680 at a junction 682. The junction 682 is also connected to another junction 684 which in turn is connected to the anode 686 of another diode 688 and to an input resistor 690. The other terminal of the resistor 690 is connected to a 10 volt negative potential 692 through a resistor 694 and to a base 696 of a transistor 700, having an emitter 702, connected to a 2 volt negative potential 704 and a collector 698 connected to a positive 15 volt potential 706 through a resistor 708. The collector 698 of the transistor 700 is also connected through a line conductor 710 to the line conductor 712 which in turn directs electronic pulses to all reset inputs R. Thus, at the count of 26 the counter 479 is reset to zero.

The counter 479 is also reset to zero in FIGURE 3 if the trigger circuit 484 does not supply a pulse while the trigger circuit 475 does supply a pulse. The trigger circuit 489 of FIGURE 3 directs its pulses to the cyclic counter 479 as shown by arrow 480.

The arrow 480 feeds these pulses through an input terminal 714 of FIGURE 5 and an inverter circuit 716, to an AND gate formed by diodes 733 and 738. From terminal 714, FIGURE 5, the pulses feed through a resistor 722 into the base 725 of transistor 718. The base of the transistor 718 is also shown connected to a 2 volt negative potential 728, through a resistor 724; while the collector of the transistor 718 is connected to a positive potential 715 through a resistor 720 and its emitter 726 is connected to ground 717. The collector 719 is connected to the cathode 732 of the diode 733, while the anode 734 of the diode 733 is connected to a junction 740. The junction 740 is connected to a 15 volt positive potential 736 through a resistor 735.

The junction 740 can receive electronic pulses from the anode 734 of the diode 733 and from an anode 737 of a diode 738. The junction 740 directs these pulses to the junction 684 to which the anode 686 of the diode 688 is connected.

The pulses reaching the junction 740 from the anode 737 of the diode 738 are fed into the cyclic counter 479 at the input terminal 720, which is connected to a cathode 739 of the diode 738. A pulse is fed to the base 696 of the transistor 700 only when a pulse is fed at the input 720 but no pulse is fed at the input 714. The input 720 also directs pulses fed into it to the cathode 742 of the diode 743 where anode 744 is connected to a base 752 of a transistor 751 through a junction 748. The junction 748 is shown connected to a 15 volt positive potential 750 at a junction 745 through a resistor 749. The junction 745 is directly connected to a collector 753 of the transistor 751. An emitter 754 of the transistor 751 is shown connected to a junction 746, which is in turn connected to the C input of the first binary counter unit 600. The junction 746 is also shown connected to a 10 volt negative potential 756 through a resistor 755.

In FIGURE 3 the cyclic counter 479 serves to regulate the type of signal fed into the monitor 461.

While several embodiments of the invention have been illustrated and described, various changes in the form and relative arrangement of the parts, which will now appear to those skilled in the art may be made without departing from the scope of the invention. Rerefence is, therefore, to be had to the appended claims for a definition of the limits of the invention.

What is claimed is:

1. An image signal processing system comprising image scanning means for scanning images, a first intensity signal generating means for generating first intensity signals in accordance with the intensity of the image being scanned by said image scanning means, scanning synchronization signal generating means, signal receiving and image reproducing means, signals transmission means for transporting the intensity signals and synchronization signals to signal receiving and image reproducing means, a first scanning rate signal generating means for transforming the first intensity signal from said first intensity signal generating means into a scanning rate signal in accordance with a predetermined frequency bandwidth by which said signals transmission means is characterized, means of generating second intensity signals corresponding to a difference of the first intensity signals between two consecutive images, second scanning rate signal generating means for transforming the second intensity signal into a second scanning rate signal in accordance with the predetermined frequency bandwidth by which said signals transmission means is characterized, switching means for switching into said image scanning means, and said signal transmission means the first scanning rate signals and the second scanning rate signals and for diverting to said signal transmission means the first intensity signals and second intensity signal, respectively.

2. The structure as in claim 1 further comprising means operable for directing signals of the first intensity signal and the first scanning rate signal to be supplied to said transmission means for transmission during a small portion of time for initiating a reference image in said signal receiving and image reproducing means, while the second intensity signal and the second scanning rate signal are supplied to said transmission means during the majority of the time.

3. A narrow bandwidth image processing system comprising image scanning means for scanning image, first intensity signal generating means for generating first intensity signals, signal receiving and image reproducing means, signal transmission means for transporting intensity and sweep signals from said image scanning means and said intensity signal generating means to said signal receiving and image reproducing means, a first scanning rate generating means for transforming the first intensity signal into a first scanning rate signal in accordance with a frequency bandwidth by which said signal transmission means is characterized, means for storing the first intensity signals of an image, sweep signals generating means, reading means for recovering the first intensity signals from said first intensity signals storing means, means for generating second intensity signals by subtracting the first intensity signals supplied by said first intensity signal generating means and the first intensity signal corresponding to a previously scanned image, recovered from said storage reading means, second scanning rate generating means for transforming the second intensity signals into a second scanning rate signal in accordance with a frequency bandwidth by which said signal transmission means is characterized, means for storing the second scanning rate signal, second reading means for recovering the second scanning rate signals, means of generating scanning synchronization signals from the first and second scanning rate signals, means of switching the first scanning rate signals and the second scanning rate signals from said storage reading means to said scanning synchronization means, and means of directing the intensity signals and the scanning synchronization signals to said transmission means.

4. A narrow band image processing system comprising image scanning means for scanning an image, first intensity signal generating means for generating a first intensity signal proportional to the intensity of the portion of the image being scanned, signal receiving and image reproducing means, signal transmission means for transporting intensity and image scanning synchronization signals to said receiving and image reproducing means, a first scanning rate generating means for transforming the first intensity signal into a first scanning retardation signal in accordance with a frequency bandwidth by which said signal transmission means is characterized, means for storing the first intensity signal of an image being scanned, a first scanning retardation signal storing means, first reading means for recovering the first intensity signal from said first intensity signal storing means, a second reading means for recovering the first scanning retardation signals from said storing means for this signal, means for generating second intensity signals by subtracting the first intensity signals supplied by said first intensity signal generating means and the first intensity signals corresponding to a previously scanned image and recovered from said storage reading means for this signal, means for generating a second scanning rate retardation signal in accordance with the frequency bandwidth by which said transmission means is characterized corresponding to the difference in intensity between two consecutive images, means for storing the second scanning rate retardation signal, reading means for recovering the second scanning rate retardation signal from said second scanning rate retardation signal storing means, scanning synchronization signal generating means operating with the scanning rate retardation signals supplied by said reading means for these signals, switching means for switching the scanning rate retardation signals belonging to a single image and the scanning rate retardation signals belonging to the intensity difference between two consecutive images, from said respective reading means to said scanning synchronization signal generating means, means of directing the scanning synchronization signals to said generating means, image scanning means, said storing and reading means and said signal transmission means, and means of switching either the first intensity signal from said first intensity signal generating means or the second intensity signal from said generating means for this signal to said signal transmission means.

5. The structure as in claim 4 further comprising means for deriving the direction of scanning.

6. The structure as in claim 4 further comprising means for deriving the direction of scanning by reversing the direction of scanning at the end of every field.

7. The structure as in claim 4 further comprising means for deriving the direction of scanning by reversing the direction of scanning at the end of every field and a cyclic counter for supplying signals for driving said switching means.

8. The structure as in claim 4 further comprising means for deriving the direction of scanning by reversing the direction of scanning at the end of every field, cyclic counter providing counting of a predetermined number of scan lines to be scanned in one forward direction while said transmission means receives intensity signals and scanning synchronization signals pertaining to the difference of the intensity between two consecutive images, one line scanned in both forward and reverse direction while said transmission means receives intensity signals and scanning synchronization signals pertaining to full intensity of a single image.

9. A narrow band image transmission system comprising image scanning means for scanning an image, first electrical signals proportional to the portion of a first image being scanned, generated by said scanning means, transmission means having a predetermined frequency bandwidth for transporting said electrical signals to signal receiving and picture reproducing means, means for changing said electrical signals to rate signals, corresponding to the rate of change of said electrical signals of the first image, means of stretching the decay of said rate signals in time, first electrical signals storage means, means of storing the stretched rate signals, means of generating second electrical signals proportional to the portion of a second image being scanned, means of recovering the first electrical signals from said first electrical signals storage means, means of generating the difference between the recovered first electrical signals and said second electrical signals, means of generating second rate signals corresponding to the rate of change of the difference between said first electrical signals and said second electrical signals, means of prolonging the decay of the second rate signals, means of storing the prolonged second rate signals, means of recovering the prolonged second rate signals from said storage means for those signals, means of regulating the rate of scanning of said image scanning means during portion of the time in accordance with the recovered prolonged second rate signals, means of recovering the stretched rate signals from storage, means of regulating the rate of scanning of said image scanning means during the remaining portion of the time in accordance with the stretched rate signals and means of connecting the associated vertical sweep signals and horizon sweep signals with said scanning means and said transmission means.

10. A television system for scanning frequency bandwidth comprising image scanning means for generating a first image intensity signal, first storage means for storing the first image intensity signal, signals receiving and image reproducing means, transmission means characterized by a predetermined frequency bandwidth for bringing signals to said signals receiving and image reproducing means, means of deriving from the first image intensity signal a first rate signal and a first rate smoothly decaying signal in accordance with the predetermined frequency bandwidth of said transmission means, means of storing the first rate smoothly decaying signal, first intensity signal storage reading means and first rate smoothly decaying signal storage reading means, means for deriving a second intensity signal approximately equal to a difference between the first intensity signal of a presently scanned image frame, from said image scanning means and the first intensity signal from said first intensity signal storage reading means of a previously scanned image frame, means of generating a second rate signal and a second rate smoothly decaying signal from the second intensity signal, means of storing the smoothly decaying second rate signal, second rate smoothly decaying signal storage reading means, means of switching into said transmission means either the first intensity signal from said image scanning means and the first rate smoothly decaying signal from said first smoothly decaying signal storage reading means or the second intensity signal from said second intensity signal deriving means and the smoothly decaying second rate signal from said second rate storage reading means, means of switching either the first or the second smoothly decaying rate signal from their said respective storage means to said image scanning, said signal storing and storage reading means in accordance with which signal is being fed to said transmission means by said intensity signal switching means, means of reversing the direction of scanning of said image scanning means, a cyclic counter means operable to supply driving pulses to said intensity signal switching means, said rate signal switching means, and the scanning direction reversing means, whereby said transmission means receives for transmitting to said signal receiving and image reproducing means signals corresponding to two consecutive images during the majority of the time and signals corresponding to a single image during a small part of the time.

11. The structure as in claim 10 further characterized in that the first and second smoothly decaying signal storing and reading means are further comprising means for formulating a scanning rate capable of supplying advanced information to said receiving and image reproducing means as to intensity variation to come, means of superimposing in said respective storing means the smoothly decaying first rate signal, while said image scanning means scan in a forward direction, to the smoothly decaying first rate signal, while said image scanning means scan in a reverse direction, for the generation of a first composite scanning rate signal associated with the transmission of a full image intensity signal, and means of superimposing in said respective storing means the smoothly decaying second rate signal, while said image scanning means scan in forward direction, to the smoothly decaying second rate signal, while said image scanning means scan in the reverse direction, for the generation of a second composite scanning rate signal associated with the transmission of the difference of the image intensities in two consecutive frames, whereby a symmetrically smooth scanning rate results in both the forward and reverse direction of scanning.

12. A television system for saving frequency bandwidth comprising means of scanning an image for the generation of a first signal proportional to the intensity of the portion of the image being scanned, means of storing and reading the first intensity signal, means of generating a second image intensity signal approximately equal to the difference between the first intensity signal of a presently scanned image frame, arriving from said image scanning means and a first image intensity signal arriving from said first intensity signal storing and reading means, and belonging to a previously scanned image frame, signal receiving and image reproducing means, transmission means characterized by a predetermined frequency bandwidth for transmitting image intensity signals and scanning synchronization signals alternately pertaining to a full image and to the difference in intensity between two consecutive images in accordance with a predetermined sequence, storage tube means for deriving scan rate signals proportional to the first intensity signal for driving said image-scanning means, said scanning and reading means and said signal receiving and image reproducing means, cyclic counter means for generating switching signals in accordance with the predetermined sequence for the generation of intensity signals and scanning synchronization signals in accordance with the predetermined sequence, cyclic counter means connected to said receiving and image reproducing means for synchronizing the image scanning in said image reproducing means with the scanning of said image scanning means.

13. The structure in claim 12 further comprising means of transforming the first intensity signal in accordance with the frequency bandwidth by which said transmission means is characterized, into a first scan rate signal in a forward direction, means of storing and reading the first scan rate signal, means of adding to the first scan rate signal, in storage, a similar signal derived during the scanning of the image in the reverse direction for the derivation of a first composite scan rate signal, similar means for deriving a similar second composite scan rate signal from the second intensity signal means of storing and reading the second scan rate signal, whereby advanced scanning information is supplied to said image reproducing means in both the forward and reverse scanning directions during the transmission of the first intensity signal and during the transmission of the second intensity signal.

14. The structure as in claim 13 further characterized in that said means for adding to the first scan rate signal a similar signal while scanning in the reverse direction is further comprising means for detecting the derivative of the previously stored scan rate signal and means of altering the stored scan rate signal, if it possesses a negative derivative but leaves it unaltered, if it possesses a positive derivative, for the generation of bi-directionally, smoothly decaying scanning rate signals.

15. A television system for saving frequency bandwidth comprising means of generating a first intensity signal proportional to the intensity of an image of an image frame being scanned, means of storing and recovering the first intensity signal, means for generating a first rate of scanning operable to reduce the velocity of scanning where the image intensity changes faster than a predetermined rate, means for generating a second intensity signal proportional to the difference in intensity between two consecutive image frames, means for generating a second rate of scanning operable to reduce the velocity of scanning where the difference in intensity between the two consecutively scanned image frames changes faster than the predetermined rate, means of transmitting alternately the first intensity signal with the first scan rate signal followed by the second intensity signal with the second scan rate signal means of receiving and adjusting these signals, image displaying means, means for storing and reading the image of the first intensity signal, means of continuously adjusting the first intensity image by adding to the stored image the received second intensity signal, means of renewing the stored image by the use of the first intensity signal, means for utilizing the received respective first scan rate signal and second scan rate signal for the generation of scan rates in said image displaying means and said storing and reading means, whereby a picture can be reproduced.

16. The structure as in claim 15 further characterized in that said image display means and said storing and reading means are embodied in a single direct view storage tube means.

17. A television system for saving frequency bandwidth comprising image scanning means operable to reverse the direction of scanning at the end of each image frame, a first intensity signal proportional to the intensity of the image being scanned, generated by said image scanning means, storing and reading means for storing the first intensity signal while a frame is being scanned by said image scanning means, reading the first intensity signal which has been stored in said storing means while a previous frame was scanned, comparator means to compare the newly generated first intensity signal by said scanning means with the stored and read first intensity signal of a previous image frame, supplied by said storing and reading means, means for adjusting the stored first intensity signal, in accordance with the newly generated first intensity signal, means for generating a second intensity signal approximately equal to the difference between the two signals compared by said comparator means, means for generating first and second scanning retarding signals corresponding to the first and second intensity signals respectively, means of smoothing the decay of the first and second scanning signals in both a forward and reverse scanning sense, means of storing and reading the first and second scanning retarding signals, means of deriving a first and second scanning signals from the first and second scanning retarding signals, signals receiving and image reproducing means, signals transmission means, cyclic counter means for generating a sequence whereby a predetermined number of lines are scanned in same direction while the second scanning signal operates said image scanning means, said storing and reading means, said transmission means and said receiving and image reproducing means, then one line being scanned in both a forward and a reverse direction while the first scanning signal operates same means for the generation and renewal of a reference image in the signals receiving and image reproducing means.

18. The structure in claim 17 further characterized in that in conjunction with the second scanning signals the second intensity signal is transmitted by said transmission means and that in conjunction with the first scanning signals the first intensity signal is transmitted by said transmission means to said signal receiving and image reproducing means, said image reproducing means further comprising a second cyclic counter means for synchronizing the scanning of said image reproducing means with the scanning of said image scanning means.

References Cited

UNITED STATES PATENTS

| | | | |
|---|---|---|---|
| 3,423,526 | 1/1969 | Law ---------------- | 178—6.8 |
| 2,321,611 | 6/1943 | Moynihan. | |
| 2,717,329 | 9/1955 | Jones. | |
| 2,980,765 | 4/1961 | Holloway. | |
| 2,996,574 | 8/1961 | Tobey. | |
| 3,184,542 | 5/1965 | Horsley. | |
| 3,286,026 | 11/1966 | Greutman ---------- | 178—6.8 |

ROBERT L. GRIFFIN, Primary Examiner

JOSEPH A. ORSINO, Assistant Examiner

U.S. Cl. X.R.

178—6; 325—38